Figure 1:
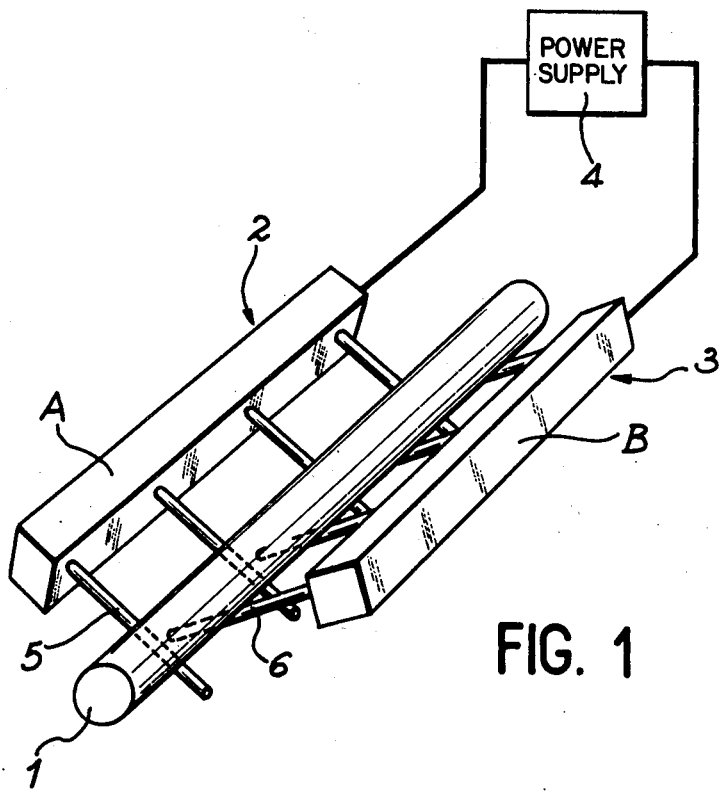

United States Patent [19]
Brochier et al.

[11] 4,447,694
[45] May 8, 1984

[54] APPARATUS FOR BREAKING UP METAL PARTS

[75] Inventors: Michel Brochier, Jarrie; Jean Chavand, Grenoble, both of France

[73] Assignee: Commissariat a l'Energie Atomique, France

[21] Appl. No.: 312,773

[22] Filed: Oct. 19, 1981

[30] Foreign Application Priority Data

Oct. 23, 1980 [FR] France .................................. 80 22683

[51] Int. Cl.³ ........................ B23P 1/02; B02C 19/00
[52] U.S. Cl. ..................................... 219/68; 219/384; 241/1
[58] Field of Search ............. 219/68, 69 W, 383, 384; 241/1, 301; 99/358

[56] References Cited

U.S. PATENT DOCUMENTS 2,606,266  8/1952  Duch et al. .......................... 219/68
2,966,572 12/1960  Hobbs ................................ 219/223

FOREIGN PATENT DOCUMENTS 599690 11/1926 France ................................ 219/383

Primary Examiner—B. A. Reynolds
Assistant Examiner—Alfred S. Keve

[57] ABSTRACT

An apparatus for breaking up metal parts is characterized in that it comprises at least two conductive supports connected to an electric power supply and able at least partly to support the part to be broken up. Application to the breaking up of metal parts by a thermoelectric effect.

1 Claim, 4 Drawing Figures

APPARATUS FOR BREAKING UP METAL PARTS

The present invention relates to an apparatus for breaking up metal parts. It is applicable to the breaking up of metal parts with a view to their processing, recycling or storage.

It is known that it is possible to break up materials or metal parts by using grinders, shears and in general manner mechanical or thermal cutting machines. The thermal cutting machines can, for example, be cutting torches or plasma torches. These different machines have the disadvantage of being subject to rapid wear. In the case of mechanical machines when it is necessary to break down filiform objects (wires, small tubes, springs, etc.) jamming of the said objects often occurs in the moving parts of the machine used for shearing purposes. In addition, such machines are difficult to maintain, particularly in a hostile environment (toxic, dusty, etc.).

The object of the present invention is to obviate these disadvantages and in particular to provide a thermal apparatus for breaking down metal parts which obviates any jamming of the said parts and which is also able to operate in a hostile environment.

The invention therefore relates to an apparatus for breaking up metal parts, wherein it comprises at least two conductive supports connected to an electric power supply and which can at least partly support the part to be broken up.

According to another feature of the invention the two conductive supports are constituted by two comb-like members, whose teeth are respectively meshed.

According to another feature the conductive supports are constituted by rollers rotating in opposite directions.

According to another feature the rollers have parallel axes in the same horizontal plane, the gap between the rollers being less than the largest dimension of the part to be broken up.

According to another feature the rollers have parallel axes, but which are not located in the same horizontal plane.

The invention is described in greater detail hereinafter relative to non-limitative embodiments and the attached drawings, wherein show:

FIG. 1—diagrammatically a first embodiment of the apparatus according to the invention.

Figure 2:
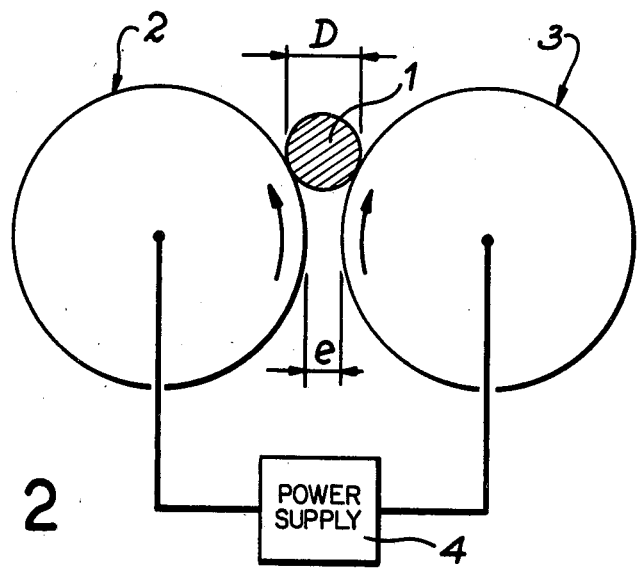
Figure 3:
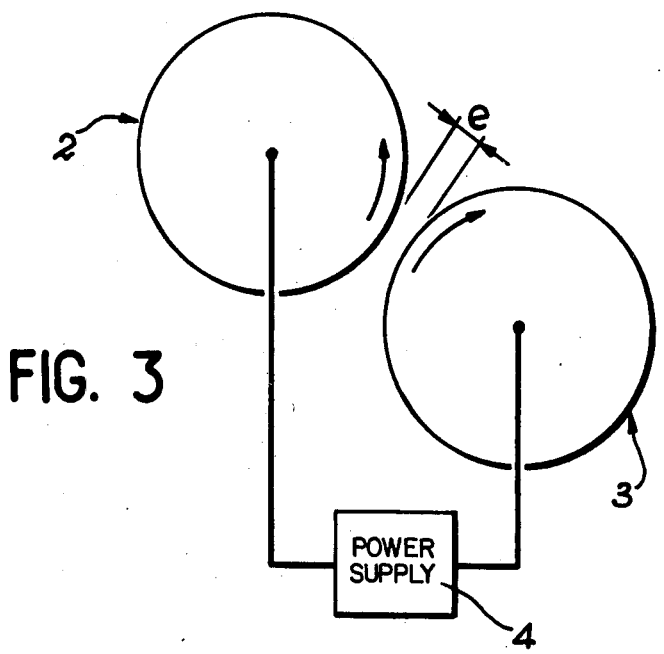
Figure 4:
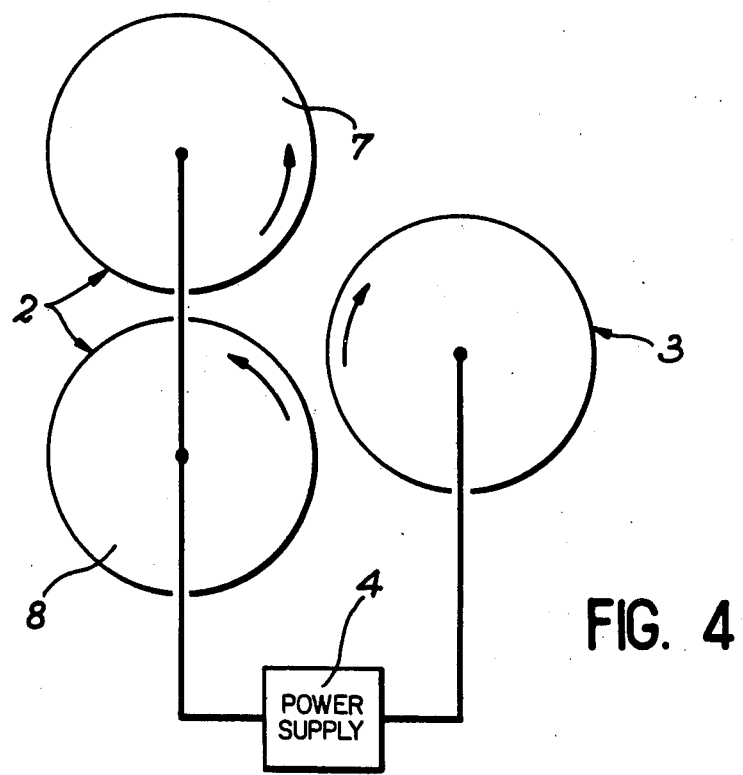

FIGS. 2, 3 and 4—diagrammatically other embodiments of apparatuses according to the invention.

FIG. 1 shows a first embodiment of an apparatus according to the invention. This apparatus makes it possible to break up metal parts, such as the filiform part 1. It comprises at least two conductive supports 2, 3 connected to an electric power supply 4. These conductive supports can at least partly support the part to be broken up. In this first embodiment the two supports 2, 3 are constituted by comb-like members, whose teeth 5, 6 are respectively meshed so that the teeth of the comb-like members are parallel to each other and so as to give an overall funnel shape. Any metal object and particularly any filiform metal part falling into the funnel brings about a short-circuit between the teeth of the two combs. This object is then broken up either by the Joule effect or by sparking. The apparatus according to the invention in this first embodiment has the advantage of being very simple, having very easy maintainance and being able to operate in a hostile environment. For example it permits the breaking up of a stainless steel wire with a diameter of 1 mm into a plurality of approximately 3 cm lon portions. Bars A and B of combs 2, 3 are made from brass, whilst teeth 5, 6 are e.g. of graphite. This apparatus permits the processing in the form of a number of portions of metal wires or tubes which have been in contact with toxic products.

FIGS. 2, 3 and 4 show other embodiments of the apparatus according to the invention.

In FIG. 2 the conductive supports 2, 3 connected to the power supply 4 are constituted by rollers rotating in opposite directions. FIG. 2 does not show the means for rotating these rollers because they are of a per se known nature. In this embodiment the rollers have parallel axes in the same horizontal plane and their gap e is less than the largest dimension D of part 1 to be broken up. These rollers rotate in opposite directions so as to oppose the passage of the part to be broken up in order to increase the duration of the short circuit causes between these rollers by the presence of the part to be broken up.

FIG. 3 shows another embodiment of the apparatus according to the invention. The conductive supports 2, 3 connected to the power supply 4 are once again constituted by rollers, whose axes are parallel but not located in the same horizontal plane. In this case the size of the part or parts to be broken up can be of a random nature with respect to the spacing e between the rollers.

FIG. 4 shows another embodiment of the apparatus according to the invention. In this case conductive support 2 is constituted by two rollers 7, 8, whilst conductive support 3 is another roller rotating in the opposite direction to the rotation direction of the first two rollers. Rollers 7 and 8 and roller 3 are respectively connected to the electric power supply 4. The axes of the different rollers are parallel to one another, but are not located in the same horizontal plane. The size of the parts to be broken up is of a random nature with respect to the gaps between the different rollers.

Like the first embodiment, the three latter embodiments make it possible to condition or process e.g. metal wires or exchanger tubes.

We claim:

1. An apparatus for breaking up filiform metallic parts, comprising at least two fixed conductive supports connected to an electric power supply, each able to at least partly support parts to be broken up, the two conductive supports being constituted by two comb-like members whose teeth are respectively meshed, the teeth of the comb-like members being parallel to each other and respectively located on two planes oriented so that the two comb-like members form a funnel, and said teeth being made of graphite.

* * * * *